(12) United States Patent
Ogawa

(10) Patent No.: US 12,517,490 B2
(45) Date of Patent: Jan. 6, 2026

(54) DISPLACEMENT COMPENSATION DEVICE AND DISPLACEMENT COMPENSATION METHOD FOR MACHINE TOOL

(71) Applicant: OKUMA CORPORATION, Niwa-Gun (JP)

(72) Inventor: Tetsuhisa Ogawa, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 391 days.

(21) Appl. No.: 18/181,622

(22) Filed: Mar. 10, 2023

(65) Prior Publication Data

US 2023/0297064 A1    Sep. 21, 2023

(30) Foreign Application Priority Data

Mar. 16, 2022    (JP) ................................. 2022-041693

(51) Int. Cl.
*G05B 19/404* (2006.01)
*B23Q 15/12* (2006.01)

(52) U.S. Cl.
CPC ........... *G05B 19/404* (2013.01); *B23Q 15/12* (2013.01); *G05B 2219/37241* (2013.01)

(58) Field of Classification Search
None
See application file for complete search history.

(56) References Cited

U.S. PATENT DOCUMENTS

| | | | | |
|---|---|---|---|---|
| 2008/0144693 A1* | 6/2008 | Sato | ........................ | G01K 15/00 374/1 |
| 2013/0116851 A1* | 5/2013 | Sasaki | ..................... | G06F 1/206 700/299 |
| 2013/0223946 A1* | 8/2013 | Yamamoto | ........... | G05B 19/404 409/80 |

FOREIGN PATENT DOCUMENTS

| | | |
|---|---|---|
| JP | H06-71541 A | 3/1994 |
| JP | H11-058179 A | 3/1999 |
| JP | 2016-048499 A | 4/2016 |

OTHER PUBLICATIONS

Japanese Office Action (with English translation) dated Mar. 25, 2025 (Application No. 2022-041693).

* cited by examiner

*Primary Examiner* — Ryan A Jarrett
(74) *Attorney, Agent, or Firm* — BURR PATENT LAW, PLLC

(57) ABSTRACT

A displacement compensation device for a machine tool includes a temperature information acquiring unit, a floor information acquiring unit, a displacement amount computing unit, and a compensating unit. The temperature information acquiring unit acquires temperature information from a temperature sensor. The floor information acquiring unit acquires floor information using a floor state sensor measuring a state of a surface or an inside of a floor on which a machine tool is installed. The displacement amount computing unit calculates an estimated displacement amount of the machine tool with a preset displacement estimation formula using the temperature information acquired by the temperature information acquiring unit and the floor information acquired by the floor information acquiring unit as inputs. The compensating unit compensates an axis command value based on the estimated displacement amount calculated by the displacement amount computing unit.

4 Claims, 2 Drawing Sheets

DISPLACEMENT COMPENSATION DEVICE AND DISPLACEMENT COMPENSATION METHOD FOR MACHINE TOOL

CROSS REFERENCE TO RELATED APPLICATION

This application claims the benefit of Japanese Patent Application Number 2022-041693 filed on Mar. 16, 2022, the entirety of which is incorporated by reference.

FIELD OF THE INVENTION

The disclosure relates to a device and a method that compensate a displacement caused by a temperature change in a machine tool.

BACKGROUND OF THE INVENTION

In a machine tool, a thermal displacement is generated on each member of a machine tool due to a temperature change in installation environment and heat generation of movable parts, resulting in a reduction in machining accuracy. As a preventive measure against these, there is a method of estimating and compensating the thermal displacement from temperature information of a machine body or a method of compensating by directly measuring a deformation of the machine body.

As a related art of the former, JP 1994-71541 A discloses a method in which a temperature sensor is installed on a machine tool main body and a thermal displacement of a main spindle is compensated based on a temperature change obtained from the temperature sensor. As a related art of the latter, JP 2016-48499 A discloses a method in which inclination angle detectors are installed at the upper end and the lower end of a column of a machining center, a thermal deformation (inclination angle) generated on the machine column is directly measured, and based on the measurement result, a displacement of a cutting edge is estimated and compensated.

Meanwhile, the thermal deformation by the temperature change in installation environment is generated not only on the machine tool, but also on a floor on which the machine tool is installed. When the floor is deformed, a bed and a table of the machine tool are also deformed, and an accuracy of the machine also changes. Therefore, in order to accurately compensate the change in machining accuracy generated by the temperature change in installation environment, a state of the floor also needs to be taken into consideration. However, the disclosure of JP 1994-71541 A estimates the thermal displacement of the main spindle based on the temperature information measured by the temperature sensor installed on the machine to compensate a displacement of a cutting edge. The disclosure of JP 2016-48499 A estimates the thermal displacement of the column based on a difference between the inclinations measured by the inclination angle detectors installed on the upper portion and the lower portion of the column to compensate the displacement of the cutting edge. More specifically, since the related arts do not consider an influence of the deformation of a floor on the machine, an accuracy change of the machine by the deformation of the floor cannot be compensated.

Therefore, it is an object of the disclosure to provide a displacement compensation device and a displacement compensation method for a machine tool that can precisely compensate an accuracy change of a machine tool and improve a machining accuracy even when a deformation is generated on a floor by a temperature change in installation environment of the machine tool.

SUMMARY OF THE INVENTION

In order to achieve the above-described object, a first configuration of the disclosure is a displacement compensation device for a machine tool. The displacement compensation device estimates a displacement of a machine tool based on temperature information from a temperature sensor installed on the machine tool and compensates an axis command value. The displacement compensation device includes a temperature information acquiring unit, a floor information acquiring unit, a displacement amount computing unit, and a compensating unit. The temperature information acquiring unit acquires the temperature information from the temperature sensor. The floor information acquiring unit acquires floor information using a floor state sensor measuring a state of a surface or an inside of a floor on which the machine tool is installed. The displacement amount computing unit calculates an estimated displacement amount of the machine tool with a preset displacement estimation formula using the temperature information acquired by the temperature information acquiring unit and the floor information acquired by the floor information acquiring unit as inputs. The compensating unit compensates the axis command value based on the estimated displacement amount calculated by the displacement amount computing unit.

In another aspect of the first configuration of the disclosure, which is in the above configuration, the floor state sensor measures any of a temperature of a floor on which the machine tool is installed, a displacement of the floor, or an inclination of the floor as the floor information.

Another aspect of the first configuration of the disclosure, which is in the above configuration, further includes a displacement information acquiring unit, an information recording unit, and a displacement formula calculating unit. The displacement information acquiring unit acquires a displacement of the machine tool. The information recording unit records the floor information, the temperature information, and displacement information acquired by the displacement information acquiring unit. The displacement formula calculating unit calculates a displacement estimation formula using the floor information, the temperature information, and the displacement information recorded by the information recording unit as inputs. The displacement amount computing unit calculates the estimated displacement amount with the displacement estimation formula calculated by the displacement formula calculating unit.

In order to achieve the above-described object, a second configuration of the disclosure is a displacement compensation method for a machine tool. The displacement compensation method estimates a displacement of a machine tool based on temperature information from a temperature sensor installed on the machine tool and compensates an axis command value. The displacement compensation method includes acquiring the temperature information from the temperature sensor; acquiring floor information using a floor state sensor measuring a state of a surface or an inside of a floor on which the machine tool is installed; calculating an estimated displacement amount of the machine tool with a preset displacement estimation formula using the temperature information acquired in the acquiring of the temperature information and the floor information acquired in the acquiring of the floor information as inputs; and compensating the axis command value based on the estimated displacement amount calculated in the calculating of the estimated displacement amount.

With the disclosure, even when a deformation is generated on a floor by a temperature change in installation environment of a machine tool, an accuracy change of the machine tool can be precisely compensated, and a machining accuracy can be improved. Since only simple devices, such as a temperature sensor, are installed, an installation cost and a running cost can be less expensive.

In particular, with another aspect of the disclosure, since a displacement estimation formula is calculated according to a machine tool and an environment where the machine tool is installed, compensation in line with the environment where the machine tool is installed can be performed.

DETAILED DESCRIPTION OF THE INVENTION

The following describes embodiments of the disclosure based on the drawings.

Embodiment 1 of the disclosure is described below.

Figure 1:
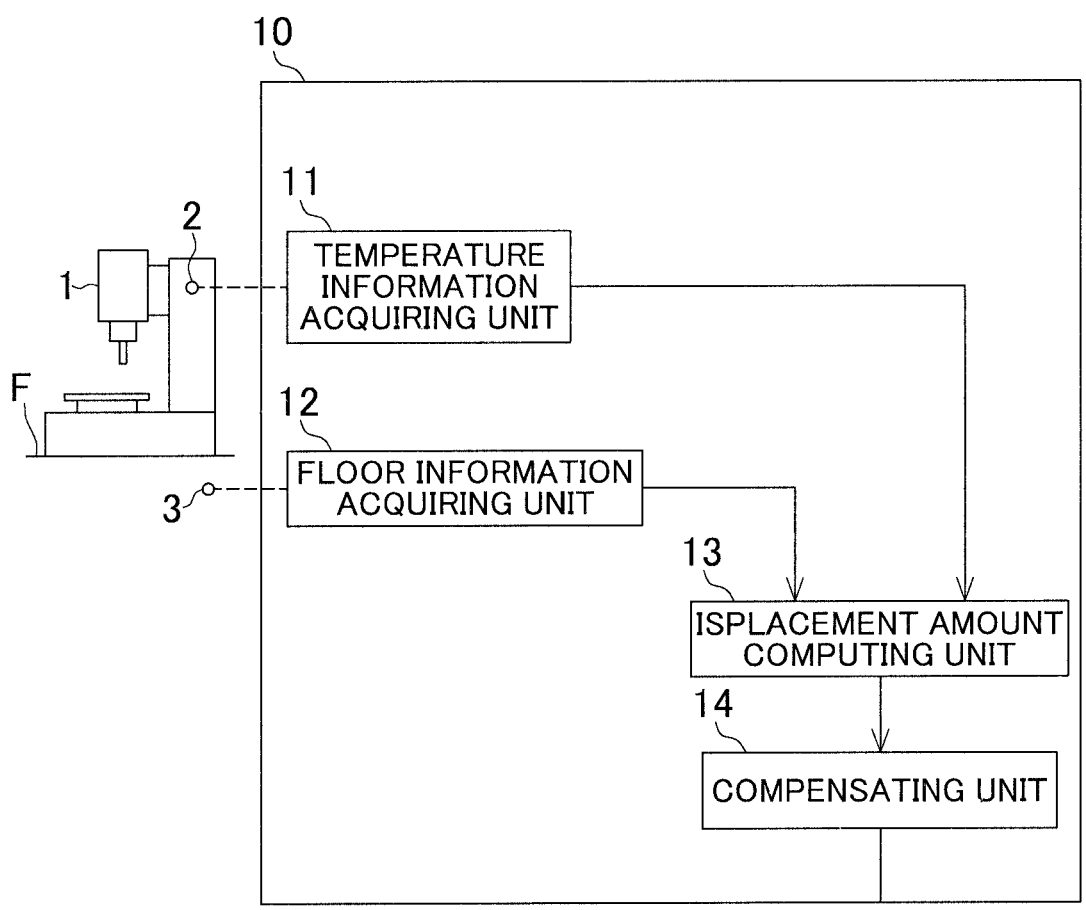
FIG. 1 is a block diagram of a displacement compensation device of Embodiment 1.

FIG. 1 is a block diagram illustrating one example in which a displacement compensation device according to a first configuration is applied to a machining center.

A temperature sensor 2 is attached to a machine body of a machining center 1. A temperature sensor 3 is attached on a surface of a floor F on which the machining center 1 is installed.

A displacement compensation device 10 is disposed in a control device of the machining center 1. The displacement compensation device 10 includes a temperature information acquiring unit 11, a floor information acquiring unit 12, a displacement amount computing unit 13, and a compensating unit 14. The temperature information acquiring unit 11 is connected to the temperature sensor 2 and acquires temperature information measured by the temperature sensor 2 (temperature information acquiring step). The floor information acquiring unit 12 is connected to the temperature sensor 3 and acquires temperature information measured by the temperature sensor 3 (floor information acquiring step). Instead of the temperature sensor 3, sensors, such as a displacement meter and a clinometer, which can quantitatively measure a state of the floor F may be used. The displacement compensation device 10 includes a central processing unit (CPU) and a memory connected to the CPU and ensures the operations.

The displacement amount computing unit 13 calculates an estimated displacement amount based on a predetermined displacement estimation formula using the temperature information sent from each of the temperature information acquiring unit 11 and the floor information acquiring unit 12 as inputs. Then, the displacement amount computing unit 13 outputs the calculated estimated displacement amount to the compensating unit 14 (displacement amount computing step). The displacement estimation formula is set for each axis, and for a three-axis machining center, a displacement estimation formula is set for each of the X-axis, Y-axis, and Z-axis.

The compensating unit 14 calculates a displacement compensation amount that compensates an axis command value based on the input estimated displacement amount and executes compensation by performing axis movement corresponding to the displacement compensation amount (compensating step).

Next, a calculation method of the estimated displacement amount in the displacement amount computing unit 13 is described.

The displacement estimation formula to calculate an accuracy change of a cutting edge of the machining center 1 is expressed as the following Formula (1).

[Math. 1]

$$\Delta Z = f(T_f) + g(T_m) \qquad \text{(Formula 1)}$$

$\Delta Z$: Cutting edge accuracy change
$T_f$: Floor temperature at the time of applying accuracy change compensation
$T_m$: Machine body temperature at the time of applying accuracy change compensation
$f$ Function of machine body displacement by floor deformation
$g$: Function of displacement by machine body temperature change The cutting edge accuracy change $\Delta Z$ of Formula (1) is the sum of the function $f$ for estimating the machine body displacement at the time of the temperature Tf of the floor F and the function g for estimating the machine body displacement at the time of the temperature Tm of the machine body.

The information acquired from the temperature sensor 3 is not limited to the temperature information of the floor F as used in Formula (1). For example, information, such as an inclination of the floor F by a clinometer and a displacement of the floor F by a displacement meter, which allows directly measuring and indirectly estimating the deformation of the floor F to quantify it, may be used.

The function $f$ related to the machine displacement due to the temperature change of the floor F and the function g related to the machine displacement due to the temperature change of the machine are expressed by formulae of a first-order lag system as respectively shown in the following Formula (2) and Formula (3).

[Math. 2]

$$f(T_f) = \alpha(T_f - T_{fd})(1 - e^{-t/\tau_f}) \qquad \text{(Formula 2)}$$

$$g(T_m) = \beta(T_m - T_{md})(1 - e^{-t/\tau_m}) \qquad \text{(Formula 3)}$$

α: Displacement estimation coefficient
β: Displacement estimation coefficient
$T_{fd}$: Floor temperature at the time point of reference for accuracy change
$T_{md}$: Machine body temperature at the time point of reference for accuracy change
$\tau_f$: Time constant
$\tau_m$: Time constant
t: Elapsed time The displacement compensation device 10 of the above Embodiment 1 includes the temperature information acquiring unit 11, the floor information acquiring unit 12, the displacement amount computing unit 13, and the compensating unit 14. The temperature information acquiring unit 11 acquires the temperature information from the temperature sensor 2. The floor information acquiring unit 12 acquires the floor information using the temperature sensor 3 (one example of a floor state sensor) that measures the temperature of the floor F on which the machining center 1 is installed. The displacement amount computing unit 13 calculates the estimated displacement amount of the machining center 1 with the preset displacement estimation formula using the temperature information acquired by the temperature information acquiring unit 11 and the floor information acquired by the floor information acquiring unit 12 as inputs. The compensating unit 14 compensates the axis command value based on the estimated displacement amount calculated by the displacement amount computing unit 13.

With the configuration, even when a deformation is generated on the floor F due to the temperature change in installation environment of the machining center 1, the accuracy change of the machining center 1 can be precisely compensated and the machining accuracy can be improved. Since devices installed are only the simple temperature sensors 2, 3, an installation cost and a running cost can be less expensive.

Embodiment 2 of the disclosure is described below.

Figure 2:
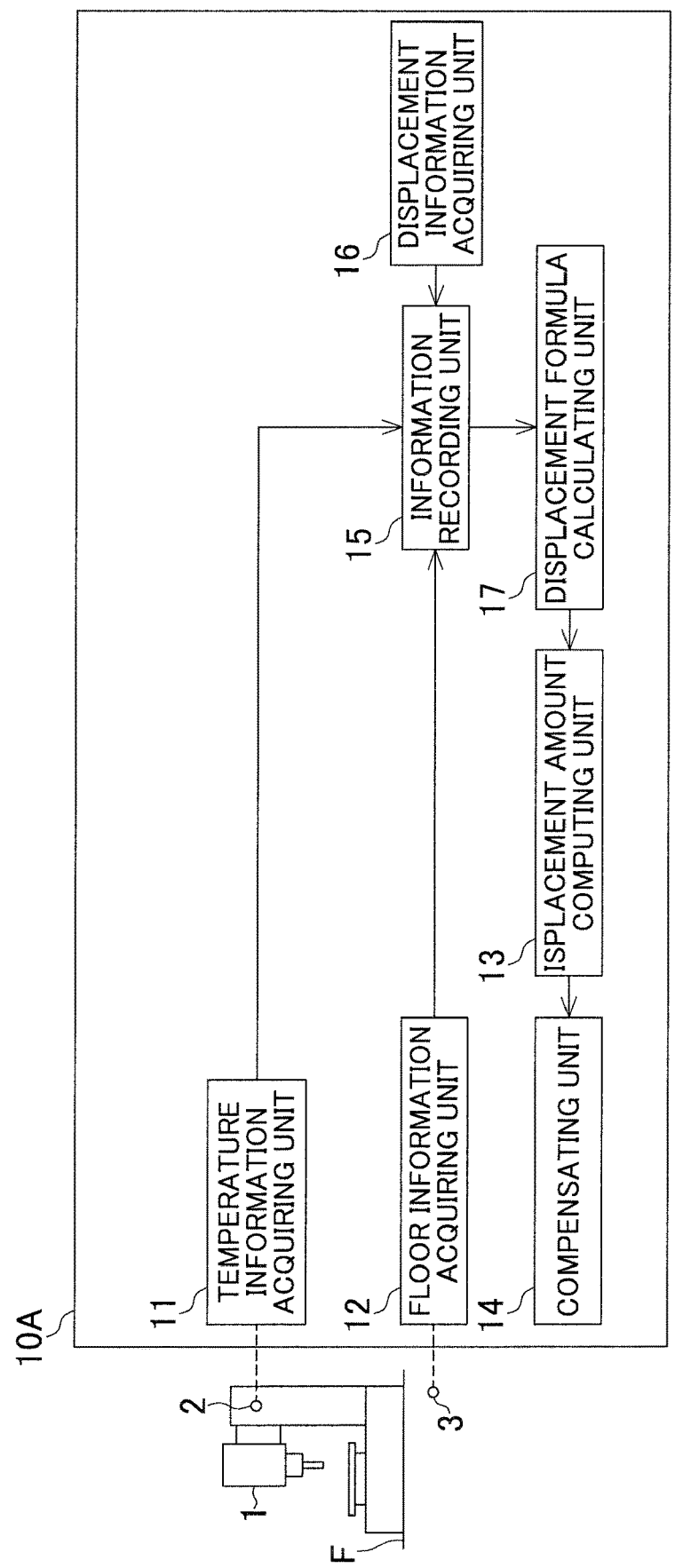
FIG. 2 is a block diagram of a displacement compensation device of Embodiment 2.

FIG. 2 is a block diagram illustrating another embodiment of a displacement compensation device. Same constituting units as those of FIG. 1 are attached with same reference numerals and overlapping descriptions are omitted.

In a displacement compensation device 10A, Embodiment 2 is different from Embodiment 1 in that an information recording unit 15, a displacement information acquiring unit 16, and a displacement formula calculating unit 17 are each included.

Each of the temperature information measured by the temperature sensor 2 and the temperature sensor 3 is transmitted to the displacement amount computing unit 13 similarly to the above Embodiment 1. Simultaneously, the temperature information is associated with time information and recorded in the information recording unit 15. In addition, displacement change information measured by an in-machine measurement device (not illustrated) is acquired by the displacement information acquiring unit 16 and associated with time information and recorded in the information recording unit 15. Various information recorded by the information recording unit 15 is output to the displacement formula calculating unit 17. Based on the output information, a displacement estimation formula is calculated by the displacement formula calculating unit 17 and output to the displacement amount computing unit 13.

The displacement change information acquired by the displacement information acquiring unit 16 is information in which the accuracy change of the machine is quantified. For example, it is measurement information when a tool length is measured with a touch sensor using a reference tool. In addition, information acquired outside the machining center 1, such as a measurement result of workpiece dimensions when the workpiece is machined, may be used.

For the displacement estimation formula, use of the past temperature information recorded by the information recording unit 15 and measurement information by a measurement device allows calculating the displacement estimation formula for an accuracy enhanced displacement estimation. For example, by using the difference between the measurement information of the change in accuracy measured using an in-machine measurement device and the estimated displacement amount by the displacement estimation formula at that time, α or β is determined such that a value of the following Formula (4) becomes minimum using the least-square method. This allows calculating the displacement estimation formula based on the actual accuracy change.

[Math. 3]

$$\Sigma_{n=0}^{N}[Z_d - \{f(T_f) + g(T_m)\}]^2 \quad \text{(Formula 4)}$$

N: Number of measured data points $Z_d$: Actual cutting edge displacement at the time of $t_n$ A method other than the least-square method shown in the embodiment may be used for calculation of the displacement estimation formula. Examples include a method of using genetic algorithm with a displacement estimation coefficient and a time constant as inputs and a method of calculating the displacement estimation formula by determining α or β using a neural network using temperature information and measured data of the displacement as inputs.

The displacement compensation device 10A of the above Embodiment 2 also includes the temperature information acquiring unit 11, the floor information acquiring unit 12, the displacement amount computing unit 13, and the compensating unit 14, thereby ensuring precisely compensating the accuracy change of the machining center 1 and improving the machining accuracy even when a deformation is generated on the floor F due to the temperature change in installation environment of the machining center 1.

In particular, here, the displacement information acquiring unit 16, the information recording unit 15, and the displacement formula calculating unit 17 are included. The displacement information acquiring unit 16 acquires the displacement of the machining center 1. The information recording unit 15 records the floor information, the temperature information, and the displacement information acquired by the displacement information acquiring unit 16. The displacement formula calculating unit 17 calculates the displacement estimation formula using the floor information, temperature information, and displacement information recorded by the information recording unit 15 as inputs. The displacement amount computing unit 13 calculates the estimated displacement amount with the displacement estimation formula calculated by the displacement formula calculating unit 17.

Thus, calculating the displacement estimation formula according to the environment where the machining center 1 is installed allows performing compensation in line with the environment where the machining center 1 is installed.

In the above-described Embodiments 1, 2, while the displacement compensation device is disposed in the control device, the displacement compensation device may be disposed separately from the control device.

In the above-described Embodiments 1, 2, while the floor temperature obtained from the temperature sensor is acquired as the floor information, any of the floor displacement or the floor inclination may be used as the floor information as described above. In addition, a plurality of pieces of information among the floor temperature, the floor displacement, and the floor inclination may be used as the floor information.

In the above-described Embodiments 1, 2, while the machining center is used as an example of the machine tool for description, the disclosure is not limited to the machining center and applicable to other machine tools in general.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A displacement compensation device for a machine tool, the displacement compensation device estimating a displacement of a machine tool based on temperature information from a temperature sensor installed on the machine tool and compensating an axis command value, the displacement compensation device comprising:
 a temperature information acquiring unit that acquires the temperature information from the temperature sensor;
 a floor information acquiring unit that acquires floor information using a floor state sensor measuring a state of a surface or an inside of a floor on which the machine tool is installed;
 a displacement amount computing unit that calculates an estimated displacement amount of the machine tool with a preset displacement estimation formula using the temperature information acquired by the temperature information acquiring unit and the floor information acquired by the floor information acquiring unit as inputs; and
 a compensating unit that compensates the axis command value based on the estimated displacement amount calculated by the displacement amount computing unit.

2. The displacement compensation device for a machine tool according to claim 1, wherein
 the floor state sensor measures any of a temperature of a floor on which the machine tool is installed, a displacement of the floor, or an inclination of the floor as the floor information.

3. The displacement compensation device for a machine tool according to claim 1, further comprising:
 a displacement information acquiring unit that acquires a displacement of the machine tool;
 an information recording unit that records the floor information, the temperature information, and displacement information acquired by the displacement information acquiring unit; and
 a displacement formula calculating unit that calculates a displacement estimation formula using the floor information, the temperature information, and the displacement information recorded by the information recording unit as inputs, wherein
 the displacement amount computing unit calculates the estimated displacement amount with the displacement estimation formula calculated by the displacement formula calculating unit.

4. A displacement compensation method for a machine tool, the displacement compensation method estimating a displacement of a machine tool based on temperature information from a temperature sensor installed on the machine tool and compensating an axis command value, the displacement compensation method comprising:
 acquiring the temperature information from the temperature sensor;
 acquiring floor information using a floor state sensor measuring a state of a surface or an inside of a floor on which the machine tool is installed;
 calculating an estimated displacement amount of the machine tool with a preset displacement estimation formula using the temperature information acquired in the acquiring of the temperature information and the floor information acquired in the acquiring of the floor information as inputs; and
 compensating the axis command value based on the estimated displacement amount calculated in the calculating of the estimated displacement amount.

* * * * *